United States Patent [19]
Nishimura et al.

[11] Patent Number: 5,900,335
[45] Date of Patent: *May 4, 1999

[54] NON-AQUEOUS SECONDARY BATTERY AND NEGATIVE ELECTRODE FOR NON-AQUEOUS SECONDARY BATTERY

[75] Inventors: Naoto Nishimura, Kitakatsuragi-gun; Takehito Mitate, Yamatotakada; Tetsuya Yoneda, Nabari; Kazuo Yamada, Kitakatsuragi-gun, all of Japan

[73] Assignee: Sharp Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/847,490

[22] Filed: Apr. 25, 1997

Related U.S. Application Data

[62] Division of application No. 08/847,490, Apr. 25, 1997, which is a continuation of application No. 08/453,172, May 30, 1995, abandoned.

[30] Foreign Application Priority Data

| Jun. 28, 1994 | [JP] | Japan | 6-146206 |
| Sep. 22, 1994 | [JP] | Japan | 6-228528 |
| Apr. 3, 1995 | [JP] | Japan | 7-077758 |

[51] Int. Cl.$^6$ ............................................. H01M 10/40
[52] U.S. Cl. ...................................... 429/231.4; 429/231.8
[58] Field of Search ............................... 423/448; 429/218

[56] References Cited

U.S. PATENT DOCUMENTS

| 4,521,328 | 6/1985 | Inoe | 252/502 |
| 4,584,252 | 4/1986 | Touzain et al. | 429/209 |
| 4,945,014 | 7/1990 | Miyabayashi et al. | 429/218 |
| 4,968,527 | 11/1990 | Yoshimoto et al. | 427/122 |
| 5,238,760 | 8/1993 | Takahashi et al. | 429/194 |
| 5,244,757 | 9/1993 | Takami et al. | 429/194 |
| 5,284,722 | 2/1994 | Sugeno | . |
| 5,352,548 | 10/1994 | Fujimoto et al. | 429/197 |
| 5,443,601 | 8/1995 | Doeff et al. | 29/623.5 |
| 5,529,859 | 6/1996 | Shu et al. | 429/194 |
| 5,547,654 | 8/1996 | Machida et al. | 423/445 R |
| 5,587,257 | 12/1996 | Tibbetts et al. | 423/448 |
| 5,656,390 | 8/1997 | Kageyama et al. | 429/44 |
| 5,686,138 | 11/1997 | Fujimoto et al. | 429/224 |

FOREIGN PATENT DOCUMENTS

| 0573266 | 12/1993 | European Pat. Off. . |
| 59-18579 | 1/1984 | Japan | H01M 10/40 |
| 5-299074 | 1/1993 | Japan . |
| 5-28996 | 2/1993 | Japan . |
| 5-114421 | 5/1993 | Japan . |
| 5-135802 | 6/1993 | Japan . |
| 7-105978 | 4/1995 | Japan | H01M 10/40 |
| 7-320726 | 12/1995 | Japan | H01M 4/04 |
| 9-1990822 | 7/1997 | Japan | H01M 4/58 |
| 9-199129 | 7/1997 | Japan | H01M 4/58 |

OTHER PUBLICATIONS

Andrew et al., "Measurement of inherent hydrogen and oxygen in graphites using laser release analysis", abstract only, CA Accession Mumber 111:46611 (no month available.) 1989.

Dahn et al. in "Lithium Batteries...," G. Pistoia, ed., Elsevier, p. 29. (No month available) 1988.

(List continued on next page.)

Primary Examiner—Maria Nuzzolillo
Assistant Examiner—Carol Chaney
Attorney, Agent, or Firm—Nixon & Vanderhye, P.C.

[57] ABSTRACT

A non-aqueous secondary battery composed of an negative electrode comprising a carbon material capable of conducting absorption-desorption or intercalation-deintercalation of lithium into or from itself, a positive electrode comprising a lithium-containing chalcogenide compound, and a non-aqueous ion conductor, in which the carbon material for the negative electrode is such that combined oxygens on its surface are substantially removed.

10 Claims, 3 Drawing Sheets

OTHER PUBLICATIONS

"Websters II New Riverside University Dictionary", New Riverside Publishing, pp. 68 and 635.

Michihide et al., Patent Abstracts of Japan vol. 8, No. 103 (E–244) May 15, 1984 (JP–A–59 018579).

Matsushita Elec. Ind.KK, Carbonblack purification (84–033168108) Dec. 23,1983. (no specific author mentioned).

Patent Abstracts Of Japan vol. 8, No. 103 (E–244) May 15, 1984 & JP–A–59 018 579 (KaoSekken).

Patent Abstracts Of Japan vol. 8, No. 285 (E–287) Dec. 26, 1984 & JP–A–59 149 674 (Kao Sekken).

Patent Abstracts Of Japan, vol. 18, No. 91 (E–1508) Feb. 15, 1994 & JP–A–05 299 074 (Sumitomo).

Patent Abstracts Of Japan, vol. 950, No. 3 (E–000) & JP–A–07 085 861 (Shin Kobe).

Patent Abstracts Of Japan, vol. 950, No. 4 (E000) & JP–A–07 105 978 (Fujitsu).

Oct. 27, 1995 European Search Report.

NON-AQUEOUS SECONDARY BATTERY AND NEGATIVE ELECTRODE FOR NON-AQUEOUS SECONDARY BATTERY

This is a divisional of application Ser. No. 08/847,490, filed Apr. 25, 1997, now pending, which is a continuation of application Ser. No. 08/453,172, filed May 30, 1995 (abandoned).

BACKGROUND OF THE INVENTION

1. Field of the Invention

The present invention relates to a non-aqueous secondary battery and a negative electrode for the non-aqueous secondary battery. More precisely, it relates to a non-aqueous secondary battery having a negative electrode of a carbon material capable of absorption-desorption or intercalation-deintercalation of lithium into or from itself, and also to the negative electrode for the battery.

2. Related Art

With the recent advances in small-sized and energy-saving electronic appliances, secondary batteries using alkali metals such as lithium, etc. have become prevalent.

When a simple substance of lithium metal is used as the negative electrode of a battery, dendrites (dendritic crystals) are formed on the surface of the metal due to the repetition of charging-discharging cycles of the negative electrode (deposition-dissolution cycles of lithium metal). The growth of the dendrites causes a problem in that the grown dendrites penetrate through the separator and are brought into contact with the positive electrode to induce the short-circuit in a battery.

When a lithium alloy is used, in place of lithium metal, as the negative electrode of a secondary battery, the formation of dendrites is retarded with the result that the characteristic of charging-discharging cycles of the battery is improved, as compared with the case where the simple substance of lithium metal is used. However, even though such a lithium alloy is used, the formation of dendrites is not completely inhibited, but still has the possibility of the short-circuit in a battery. In addition, the use of such an alloyed negative electrode results in the increase in the weight of the battery, which therefore detracts from the light weight advantage of lithium-containing secondary batteries.

Recently, matrix materials such as carbon materials, electroconductive polymers, etc. capable of absorption-desorption of lithium ions into or from themselves have been developed and used as the negative electrodes of batteries, in place of lithium metal or alloys. In principle, these materials are free from the problem of the formation of dendrites, which, as mentioned above, is inevitable in the negative electrodes comprising lithium metal or alloys,. Therefore, the use of these materials as the negative electrodes of batteries has resulted in the noticeable decrease in the problem of short circuiting of the batteries. In particular, carbon materials are preferred to the other matrix materials since their potential for absorption-desorption of lithium into or from them is nearer to the potential of lithium for its deposition-dissolution than the others. Above all, a graphite material can take theoretically one lithium atom per 6 carbon atoms in its crystal lattices. Therefore, such a graphite material has a high capacity per the unit weight of the carbon of itself (372 mAh/g; see Phys. Rev. B., Vol. 42, 6242 (1990)). In addition, a graphite material is chemically stable and therefore significantly contributes to the cycle stability of batteries having it as the negative electrode.

However, since there occur unfavorable side reactions such as the decomposition of the solvent used at the initial charging of a carbon material, the capacity loss of the carbon material is inevitable. Therefore, carbon materials are disadvantageous in that their initial charging efficiency is low since the electric capacity necessary for charging them is higher than that necessary for discharging them (see J. Electrochem. Soc., Vol. 137, 2009 (1990)). For these reasons, it is important to prevent the capacity loss of carbon materials if the materials are used as the negative electrodes of high-capacity secondary batteries.

In general, various functional groups exist on the surface of a carbon material and such functional groups act as active points in various reactions. Therefore, these functional groups act as the active points also in lithium secondary batteries having a carbon material as the negative electrode, thereby causing the irreversible capacity of the batteries.

In Japanese Patent Laid-Open No. 5-114421, there is proposed the use of a carbon material that has been chemically treated to esterify the functional groups on its surface, as the negative electrode of a battery, in order to solve the above-mentioned problem. The proposed means is effective for a carbon material having a relatively large specific surface area but is not satisfactory for a graphite material having a small specific surface area.

The proposed means of Japanese Patent Laid-open No. 5-114421 is to merely esterify the functional groups on the surface of a carbon material but is not to basically remove the active points from its surface. In addition, since it uses an organic solvent (e.g., ethyl alcohol) for the chemical treatment, the carbon material treated must be dried so as to remove the organic solvent therefrom.

In Japanese Patent Laid-Open Nos. 5-135802 and 5-299074, it is proposed to previously treat a graphite material by a wet process and thereafter calcine and dry it in an inert gas or in a vacuum thereby compensating the capacity loss, such as that mentioned hereinabove, of the material. The proposed method, as comprising the wet treatment, needs water or an organic solvent. If the graphite material treated bv the proposed method is used as the negative electrode in a batterv along with highly-reactive lithium as the active material, the water or solvent used for treating the graphite material must be completely removed.

In Japanese Patent Laid-Open No. 5-28996, it is proposed to treat a carbon material of natural graphite under heat in an iner t gas in order to reduce the capacity loss, suc h as that mentioned hereihnabove, of the material. However, this method is not effective for carbon materials and graphite materials other than natural graphite.

As mentioned hereinabove, there exist various oxygen-containing functional groups such as hydroxyl group (OH), carboxyl group (COOH) and carbonyl group (CO) and various oxygen-containing bonds such as ester bond (COO) on the surfaces of carbon materials. Since these groups and bonds are highly reactive winh lithium, these react with lithium, at the initial chariing of batteries containing a carbon material and lithium, to yield an irreversible capacity. Therefore, in producing batteries, it is necessary to previouslv incorporate into batteries an active material for the nositive electrode containing the necessary amount of lithium corresponding to the irreversible capacity. However, such incorparation, is problematic in that the capacity density of the batteries to be produced is lowered by the amount of lithium in corporated.

The oxygen-containing functional groups existing on the surface of the carbon material used as the negative electrode of a battery react with lithium stored in the carbon material while the ealtero es charged, thereby causing the self-discharging of the battery.

In addition, the oxygen-containing functional groups react with the electrolytic solution in the battery to deplete the electrolytic solution or to generate gas in the battery to thereby increase the internal pressure of the battery.

SUMMARY OF THE INVENTION

In consideration of the above-mentioned problems in the related art, there is provided according to the present invention a non-aqueous secondary battery composed of a negative electrode comprising a carbon material capable of absorption-desorption or intercalation-deintercalation of lithium into or from itself, a positive electrode comprising a lithium-containing chalcogenide compound, and a non-aqueous ion conductor, in which the carbon material for the negative electrode is such that combined oxygens on its surface are substantially removed.

There is also provided according to the present invention the negative electrode for the non-aqueous secondary battery, which comprises a carbon material that is prepared by heat treatment of a raw carbon material in a vacuum or in a reducing gas.

DESCRIPTION OF THE PREFERRED EMBODIMENTS OF THE INVENTION

Figure 1:
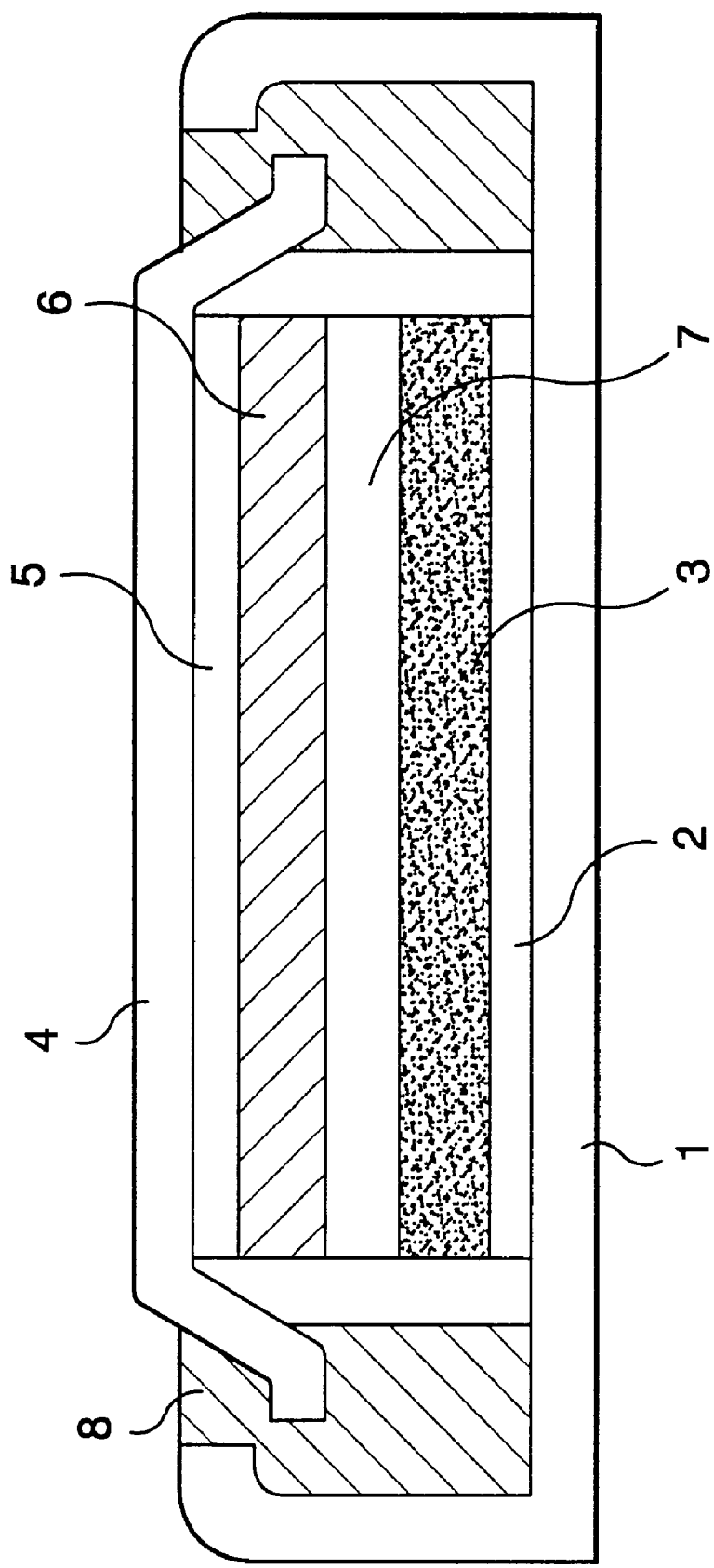
FIG. 1 is an explanatory view of the battery produced in any one of the examples and the comparative examples mentioned hereinunder.

In consideration of the current situations in the related art as mentioned hereinabove, the object of the present invention is to provide a non-aqueous secondary battery having a negative electrode comprising a carbon material, especially a graphite-type carbon material and also the negative electrode for the battery, which are characterized in that the components in the negative electrode that cause the irreversible capacity at the initial charging of the battery are reduced, the self-discharging of the battery is retarded and the decomposition of the electrolytic solution in the battery is retarded. The non-aqueous secondary battery of the present invention therefore has a high capacity, an excellent cycle characteristic and good storage stability and is safe.

The carbon material to be used in the present invention is such that the combined oxygens on its surface are substantially removed. As the raw material for the carbon material, preferred are a graphite material capable of conducting intercalation-deintercalation of lithium into or from itself (e.g., natural graphite, artificial graphite, expansive graphite, etc.) and carbon capable of conducting absorption-desorption of lithium into or from itself. Carbon capable of absorption-desorption of lithium into or from itself includes, for example, thermal-cracked carbon such as that produced by thermal cracking in the presence of a catalyst, carbon produced by calcining pitch, coke, tar, etc., carbon Droduced by calcining polymers such as cellulose, phenolic resins, etc. Of these, a graphite material is preferred, as being able to be formed into the negative electrode having a high discharging capacity.

More preferably, the carbon material is a graphite material having a mean spacing between the (002) planes ($d_{002}$) of from 0.335 to 0.340 nm, a lattice thickness in the direction of the (002) plane (Lc) of 10 run or more and a lattice thickness in the direction of the (110) plane (La) of 10 nm or more, when measured by X-ray wide-angle diffractometry. In a graphite material having the spacing ($d_{002}$) of less than 0.335 nm, its crystallization is promoted in a considerable degree. Therefore, if such a graphite material is used as the neaative electrode of a battery, it causes the decomposition of the catalyst along with the absorption or intercalation of lithium thereinto with the result that the discharging capacity of the battery is decreased. in a graphite material having the spacing ($d_{002}$) of more than 0.340 nm, its crystallization is insufficient. If such a graphite material is used as the negative electrode of a battery, the polarization of the negative electrode is too much due to the charging-discharging of the battery. If so, therefore, it is difficult to obtain a high-capacity battery. In a graphite material having La and Lc of less than 10 nm, its crystallization is insufficient. If such a graphite material is used as the negative electrode of a battery, the polarization of the negative electrode is also too much due to the charging-discharging of the battery and therefore it is difficult to obtain a high-capacity battery.

To measure the values by X-ray wide-angle diffractometry, employable are known methods such as that described in "Experimental Technology for Carbon Materials", 1, pp. 55 to 63, 1978 (edited by the Society of Carbon Materials and published by Kagaku Gijutsu-sha of Japan).

The negative electrode of the battery of the present invention may be equipped with a collector. The collector may be made of a metal foil, a metal sheet, a metal mesh, a three-dimensional porous material or the like. It is desirable that a metal that is hardly alloyed with lithium is used to form the collector in view of its mechanical strength during the repeated charging-discharging cycles of the battery. Especially preferred are simple substances of iron, nickel, cobalt, copper, titanium, vanadium, chromium and manganese and their alloys.

The non-aqueous ion conductor to be in the battery of the present invention may be, for example, an organic electrolytic solution, a solid polymer electrolyte, a solid inorganic electrolyte, a fused salt, etc. Of these, preferred is an organic electrolytic solution.

As the solvent for the organic electrolytic solution, for example, usable are cyclic carbonates such as ethylene carbonate, propylene carbonate, butylene carbonate, etc.; linear carbonates such as dimethyl carbonate, diethyl carbonate, ethylmethyl carbonate, dipropyl carbonate, etc.; lactones such as γ-butyrolactone, etc.; furans such as tetrahydrofuran, 2-methyltetrahydrofuran, etc.; ethers such as diethyl ether, 1,2-dimethoxyethane, 1,2-diethoxyethane, ethoxvmethoxyethane, dioxane, etc.; and also dimethylsulfoxide, sulforane, methylsulforane, acetonitrile, methyl formate, methyl acetate, methyl propionate, etc. One or more of these are used as a single solvent or mixed solvent.

As the electrolyte sale, usable are lithium salts which include, for example, lithium perchlorate, lithium borofluoride, lithium hexafluorophosphate, lithium hexafluoroarsenate, lithium trifluoromethanesulfonate, lithium halides, lithium chloroaluminate, etc. One or more of these electrolyte salts are dissolved in the above-mentioned solvent to prepare the electrolytic solution for use in the present invention.

The solvents and the electrolyte salts to be used for preparing the electrolytic solutions for use in the present invention are not limited to the above-mentioned ones but may be any other known ones.

The positive electrode in the non-aqueous secondary battery of the present invention comprises, as the active material, a lithium-containing chalcogenide compound. The chalcogenide compound is preferably a lithium-containing metal oxide, which includes, for example, $LiCoO_2$, $LiNiO_2$, $LiFeO_2$, $LiMnO_2$ and $Li_xM_1{-}_yN_yO_2$ of these series (where M is any one of Fe, Co and Ni, N is a transition metal, preferably a metal of the group 4B or 5B, $0 \leq x \leq 1$, and $0 \leq y \leq 1$), and also $LiMn_2O_4$, $LIM_2{-}_zN_zO_4$ (where N is a transition metal, preferably a metal of the group 4B or 5B, and $0 \leq z \leq 2$), etc.

The positive electrode is made of a mixture comprising the above-mentioned active material, an electroconductive material, a binder and optionally a solid electrolyte, etc. The mixing ratio of these components may be such that the electroconductive material is from 5 to 50 parts by weight and the binder is from 1 to 30 parts by weight relative to 100 parts by weight of the active material. If the content of the electroconductive material is less than 5 parts by weight, the internal resistance or the polarization of the electrode is too large with the result that the discharging capacity of the electrode is lowered. If so, it is impossible to produce practicable lithium secondary batteries. On the contrary, if the content of the electroconductive material is more than 50 parts by weight, the active material to be in the electrode is relatively lowered with the result that the discharging capacity of the positive electrode is also lowered. If the content of the binder is less than 1 part by weight, the ability of the binder to bind the active material is insufficient with the result that the active material is dropped from the positive electrode or the mechanical strength of the positive electrode is lowered. If so, the production of batteries is difficult. On the contrary, if the content of the binder is more than 30 parts by weight, the amount of the active material to be in the electrode is relatively lowered with the result that the internal resistance or the polarization of the electrode is enlarged and that the discharging capacity of the electrode is lowered, for the same reasons as those for the electroconductive material mentioned hereinabove. If so, it is impossible to produce practicable lithium secondary batteries.

As the electroconductive material, usable are carbon materials, such as carbon black (acetylene black, thermal black, channel black, furnace black, etc.), and also graphite powder, metal powder, etc. However, these are not limitative.

As the binder, usable are fluorine-containing polymers such as polytetrafluoroethylene, polyvinylidene fluoride, etc., polyolefinic polymers such as polyethylene, polypropylene, etc., as well as synthetic rubbers, etc. However, these are not limitative.

The carbon material to be used in the present invention is such that the combined oxygens on its surface have been removed. To remove combined oxygens from the surface of a raw carbon material so as to prepare the carbon material for use in the present invention, it is necessary to cut the chemical bonds between the carbon atoms and the oxygen atoms on the surface of the raw carbon material. For this purpose, for example, the following methods can be employed.

(1) A method of heat-treating a raw carbon material in a vacuum to thereby cut the chemical bonds between the carbon atoms and the oxygen atoms on its surface while re-bonding the thus-cut carbon atoms together, by which the combined oxygens are removed from the surface of the raw carbon material.

(2) A method of heat-treating a raw carbon material in a reducing gas to thereby cut the chemical bonds between the carbon atoms and the oxygen atoms on its surface, by which the combined oxygens existing on the surface of the raw carbon material are converted into carbon dioxide or carbon monoxide and released.

(3) A method of heat-treating a raw carbon material in a vacuum to thereby cut the chemical bonds between the carbon atoms and the oxygen atoms on its surface followed by treating the material in a single or mixed gas comprising an oxygen-free hydrocarbon gas or/and a hydrogen gas thereby bonding hydrogen or a hydrocarbon to tne Dortions resulting from the previous cutting.

Examples of these treating methods are mentioned hereinunder.

The treating temperature for the heat-treating method to be conducted in a vacuum is preferably 500° C. or higher. To treat a raw graphite material having a small specific surface area by the heat-treating method, the temperature is preferably 800° C. or higher, more preferablv 1000° C. or higher. In order to prevent the surface of the wall of the heat-treating chamber used from being alloyed with carbon of the material, it is desirable that the heat-treating temperature be not higher than 1150° C.

The pressure for the treatment is preferably $10^{-4}$ Torr or lower. If it is higher than $10^{-4}$ Torr, the substances adsorbed on the surface of the raw carbon material can be removed, but such is insufficient in order to cut the chemical bonds between the carbons and the oxygens existing on the surface of the raw carbon material. However, the pressure lower than $10^{-7}$ Torr is industrially unfavorable in view of the current heat-treating technique to be conducted in a vacuum. After the heat treatment, it is desirable that the carbon material is cooled to room temperature while the vacuum is kept during the cooling.

Figure 2:
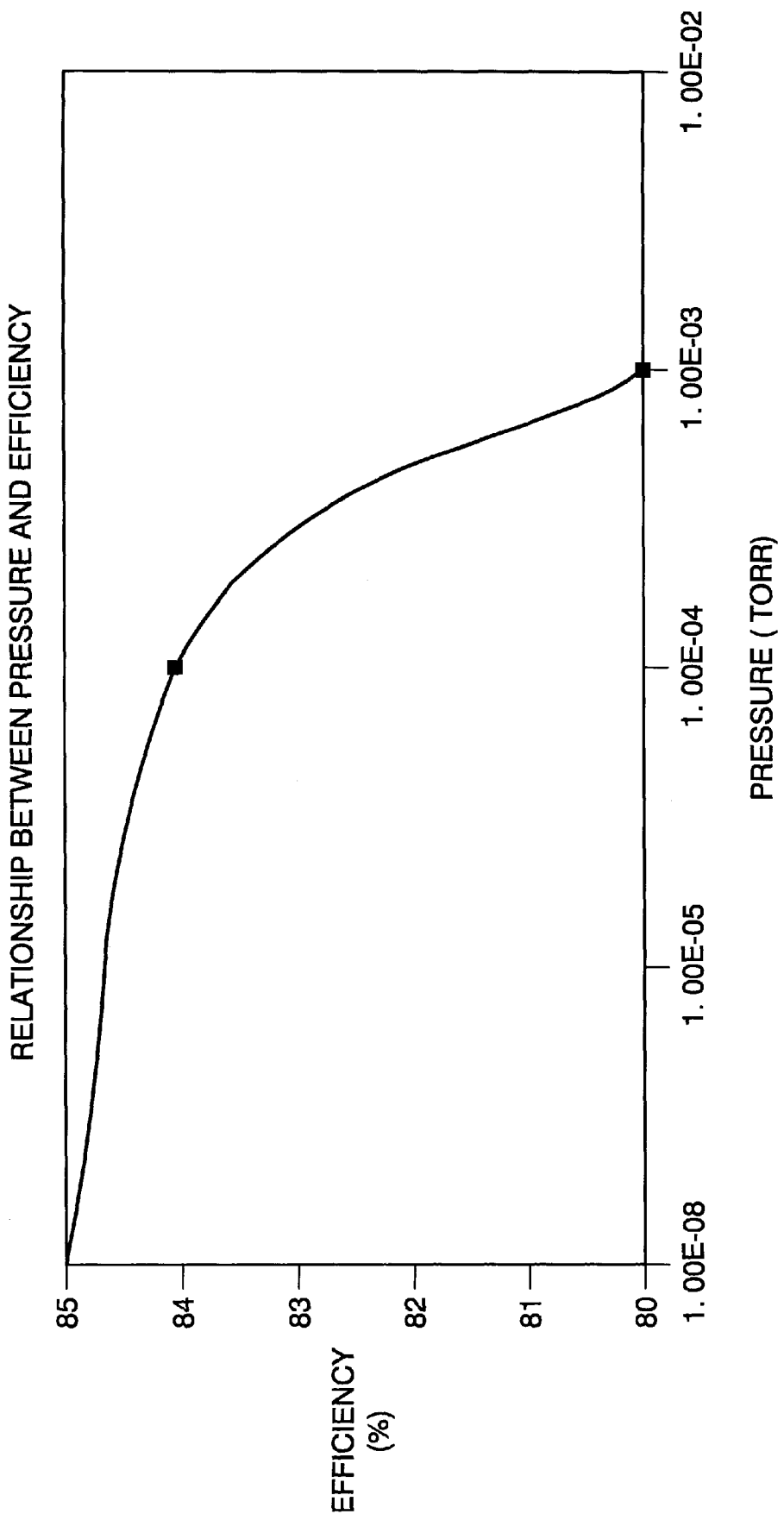
FIG. 2 is a graph showing the relationship between the pressure (vacuum degree) at 1000° C. for the heat treatment of a carbon material to produce the negative electrode of the present invention and the initial charging-discharging efficiency of the battery having the negative electrode.
Figure 3:
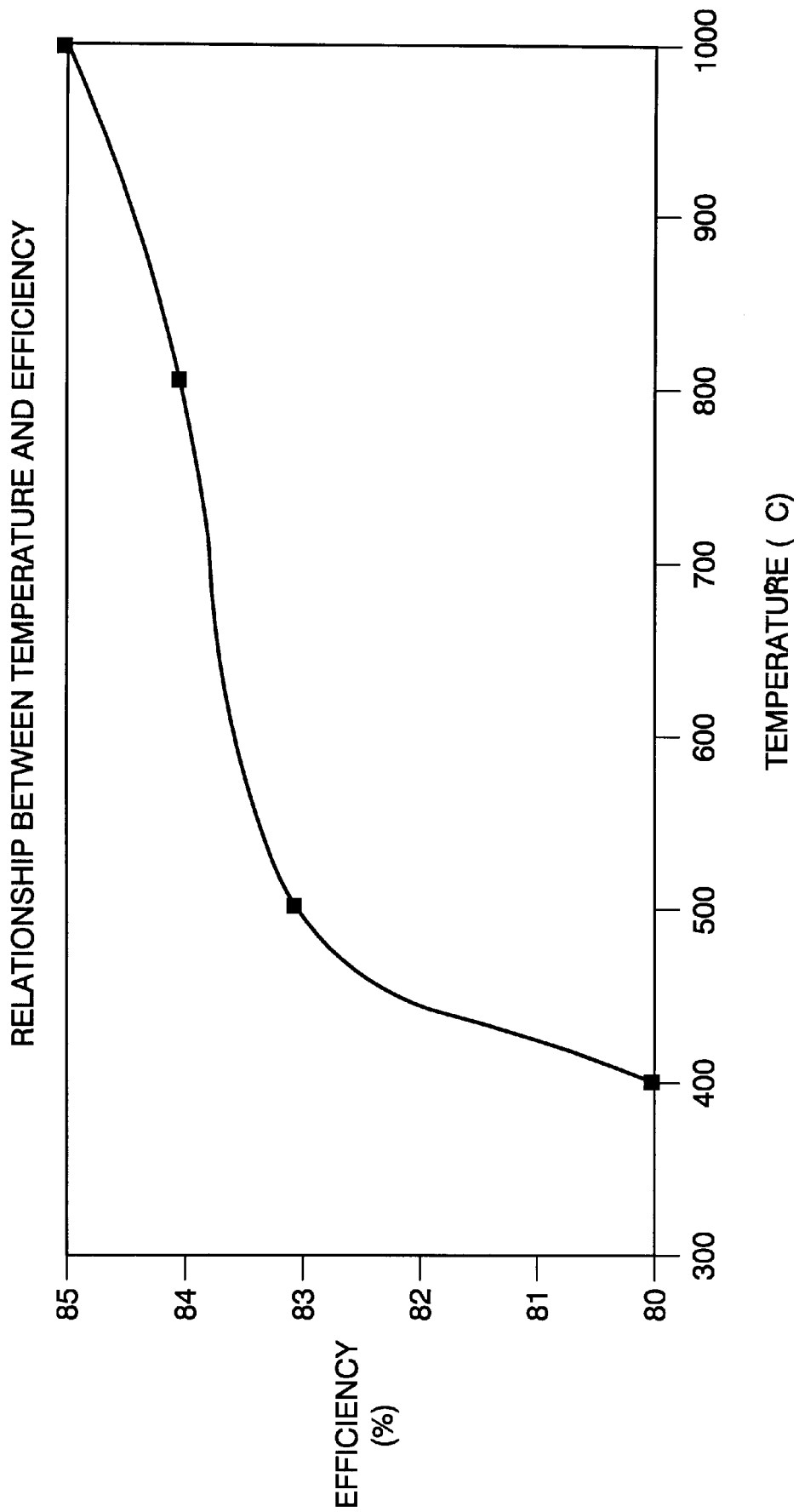
FIG. 3 is a graph showing the relationship between the heat-treating temperature at the treating pressure of $10^{-4}$ Torr for the heat treatment of a carbon material to produce the negative electrode of the present invention and the initial charging-discharging efficiency of the battery having the negative electrode.

FIG. 2 is a graph showing the relationship between the pressure (vacuum degree) at 1000° C. for the heat treatment of a raw carbon material and the initial charging-discharging efficiency of a battery having an negative electrode comprising the heat-treated carbon material. FIG. 3 is a graph showing the relationship between the heat-treating temperature at the treating pressure of $10^{-4}$ Torr for the heat treatment of a raw carbon material and the initial charging-discharging efficiency of a battery having an negative electrode comprising the heat-treated carbon material. As is obvious from these drawings, the temperature and the pressure for the heat treatment of a raw carbon material that falls within the above-mentioned ranges have a good influence on the initial charging-discharging efficiency of the battery having the negative electrode comprising the heat-treated carbon material.

Where the heat treatment of a raw carbon material is conducted in a reducing gas, the reducing gas may be a single or mixed gas comprising an oxygen-free aliphatic hydrocarbon gas, such as methane, ethane, propane, butane, ethylene, propylene, butylene, acetylene, pentene, propyne, butyne, etc., or/and a hydrogen gas. If desired, a hydrocarbon which is liquid at room temperature is gasified by bubbling or the like and the resulting hydrocarbon gas can be used as the reducing gas. The hydrocarbon which is liquid at room temperature includes, for example, pentane, hexane, pentene, hexene, etc.

The treating temperature is preferably from 400° C. to 3000° C., though depending on the reducing gas used. To treat a graphite material having a small specific surface area, the temperature is preferably 800° C. or higher. Especially preferably, the treating temperature is 1600° C. or lower. If the treating temperature is higher than 3000° C., the reducing gas used is pyrolyzed too much at such a high temperature to give soot in the gaseous phase and the surface of the carbon material being treated is sooted us. If the thus-sooted carbon material is used as the negative electrode of a battery, the soot deposited on the surface of the carbon material of the negative electrode lowers the capacity of the battery, and the production costs are increased. Therefore, such is unfavorable. If, on the contrary, the treating temperature is lower than 400° C., the reducing gas of a hydrocarbon is not pyrolyzed in the gaseous phase so that it does not react with the oxygen-containing functional groups on the surface of the raw carbon material to be treated and therefore the groups are not reduced. Such is also unfavorable. Relatively sow-priced apparatus can be used for this method.

The reduction is conducted in the presence of an inert gas in a closed or gas-passing chamber. The ratio by volume of the reducing gas to the inert gas in the chamber and the gas flows are not specifically defined. Preferably, however, the ratio is from 20/1980 to 400/1600. if the concentration of the reducing gas is lower than 20/1980, the cost of the gas flow controller to be used is too high and therefore such is unsuitable for industrial plants. If, however, the concentration of the reducing gas is higher than 400/1600, the treatment can be conducted at lower temperatures but much time is needed for sufficiently conducting the reduction. Therefore, such is unfavorable. After the treatment, it is desirable that the introduction of the reducing gas is stopped and the carbon material thus treated is cooled to room temperature in the inert gas atmosphere.

When hydrogen gas is used as the reducing gas, it is desirable that the treating temperature is from 800° C. to 1000° C. and the hydrogen gas concentration is from 1 to 100% by volume. However, such is not limitative.

The above-mentioned method (3) comprises the combination of the heat treatment in a vacuum and the treatment in a reducing gas. According to this method (3), a raw carbon material is first subjected to the above-mentioned heat treatment in a vacuum, by which the chemical bonds between the carbon atoms and the oxygen atoms on the surface of the material are cut, and thereafter the thus-treated material is further treated in a single or mixed gas comprising an oxygen-free hydrocarbon gas or/and a hydrogen gas. For the first heat treatment to be conducted in a vacuum in this method, the conditions for the above-mentioned method (1) can be employed. For the next treatment in a reducing gas in this method, the conditions for the above-mentioned method (2) can be employed. The hydrocarbon gas to be employed in this method may be any one of those referred to for the above-mentioned method (2).

The oxygen atoms to be on the surface of the carbon material that has been treated by any of the above-mentioned methods are analyzed by X-ray photoelectronic analysis.

The negative electrode of the present invention can be formed by mixing a powder of the above-mentioned carbon material and a binder and then shaping the resulting mixture. As the binder, usable are fluorine-containing polymers such as polyvinylidene fluoride, polytetrafluoroethylene, etc., polyolefinic polymers such as polyethylene, polypropylene, etc., synthetic rubbers, etc. However, these are not limitative.

The mixing ratio by weight of the carbon material to the binder may be from 70/30 to 99/1. If the weight ratio of the binder to the carbon material is larger than 30/70, the internal resistance or the polarization of the electrode to be made of the mixture is too large with the result that the discharging capacity of the battery having the negative electrode is lowered. If so, therefore, it is impossible to produce practicable lithium secondary batteries. On the contrary, if the weight ratio of the binder to the carbon material is smaller than 1/99, the binding ability of the binder to bind the carbon material or to bind the carbon material and the collector for the negative electrode is insufficient with the result that the active material is dropped from the negative electrode or the mechanical strength of the negative electrode is lowered. If so, the production of batteries is difficult.

As is obvious from the above-mentioned description, in the non-aqueous secondary battery of the present invention, the reaction between the oxvgen-containing functional group existing on the surface of tne carDon material of the negative electrode and lithium are retarded with the result that the initial charging-discharging efficiency of the battery is improved. Therefore, since the amount of lithium that is necessary for the side reaction at the first charging step is decreased, it is possible to decrease the excess amount of the active material for the positive electrode to be in the secondary battery in planning the battery. In addition, in the non-aqueous secondary battery of the present invention, since the side reaction between the oxygen-containing functional group existing on the surface of the carbon material of the negative electrode and lithium that has been stored in the carbon material while the battery has been charged are retarded, the self-discharging of the battery is reduced. Moreover, since the side reaction between the oxygen-containing functional group existing on the surface of the carbon material of the negative electrode and the electrolytic solution in the battery of the present invention are retarded, the decomposition of the electrolytic solution is also retarded and therefore the electrolytic solution is prevented from being depleted or from generating gas.

For these reasons, there is provided according to the present invention a non-aqueous secondary battery having a much higher capacity and a much higher energy density, which additionally has excellent charging-discharging cycle characteristics with retarded self-dischargeability and is safe.

More precisely, an ordinary carbon material has, on its surface, oxygen-containing functional groups such as hydroxyl group (OH), carboxyv group (COOH), etc. and oxygen-containing bonds. The oxygen atoms in such groups and bonds have a higher degree of electric negativity and a higher electron density than the carbon atoms on the surface of the material. Therefore, these are active points to cause the irreversible reaction with lithium and are related to the irreversible capacitv of the battery having an negative electrode of the material at the step of initial charging of the battery.

However, in the non-aaueous secondary battery of the present invention having the constitution mentioned hereinabove, the carbon material of the negative electrode is characteristically such that the combined oxygens have been removed from its surface. Therefore, the battery of the present invention has a much higher energy density.

The present invention is described in more detail by means of the following examples, which are intended to concretely demonstrate the present invention, however, without restricting the scope of the present invention.

EXAMPLE 1

Formation of Carbon Material by Heat Treatment in Vacuum:

A carbon material was heat-treated in a vacuum according to the process as mentioned below. As the raw material sample, used was an artificial graphite powder (KS-25; produced by Lonza Co.) comprising flaky particles having a particle size of 25 μm or less, $d_{002}$ of 0.336 nm, Lc of 100 nm or more, La of 100 nm or more, and a specific surface area of 12 m$^2$/g.

5 g of the above-mentioned graphite powder was shaped into a tablet, using a tablet-shaping machine, and treated in a high-temperature vacuum furnace at 1000° C. and $10^{-6}$ Torr for 5 hours. After this treatment, the graphite tablet was cooled to room temperature still in the vacuum and then taken out of the furnace. This was ground in an agate mortar to obtain a araphite powder that had been heat-treated in a vacuum.

Formation of Negative Electrode:

An negative electrode was formed according to the process mentioned below, using a carbon material as the active material. Briefly, a powder of a carbon material, which is an active material for an negative electrode, is dispersed in a solution or suspension of a binder and kneaded to form a paste. This paste is coated on a collector foil or into the pores of a three-dimensional porous metal collector and then heat-treated at a temperature not lower than are boiling point of the solvent used and near to the melting point or softening point of the binder used, in an inert atmosphere at an atmospheric pressure or a reduced pressure, to form an negative electrode.

In this example, the above-mentioned graphite powder was dispersed in a solution of a binder of polyvinylidene fluoride dissolved in a solvent of N-methyl-2-pyrrolidone, to prepare a paste of the active material for an negative electrode. This paste was coated on the both surfaces of a copper foil collector, pre-dried in air at 60° C. and then dried at 240° C. in a vacuum ($10^{-3}$ Torr) so as to completely remove the solvent of N-methyl-2-pyrrolidone. In this way, a sheet negative electrode was formed. This was further dried at 200° C. under a reduced pressure so as to remove water. The thus-formed negative electrode had an apparent surface area of 8 cm$^2$ and a thickness of 150 μm (including the thickness of the collector of 50 μm).

Evaluation of Negative Electrode:

A current-collecting lead wire was connected to the copper collector of the negative electrode. The characteristics of the thus-prepared unipolar negative electrode were measured in a tri-polar cell, using lithium as the counter electrode and the reference electrode therein. The electrolytic solution in the cell comprised 1 mol/liter of an electrolyte salt of lithium perchlorate dissolved in a mixed solvent (1/1, by volume) of ethylene carbonate and diethyl carbonate. The cell was subjected to a charging-discharging test where the negative electrode was charged to 0 V (relative to Li/Li$^+$) at a current density of 30 mA per the unit weight of the active material (30 mA/g-carbon) and then discharged to 2.5 V at the same current density.

As a result, the negative electrode was found to have a ratio of the quantity of the initial discharging electricity to the quantity of the initial charging electricity (initial charging-discharging Coulomb efficiency) of 85% and a discharging capacity of 360 mAh/g-carbon.

EXAMPLE 2

A sheet negative electrode was formed in the same manner as in Example 1, except that the vacuum heat treatment of the carbon material was conducted at 1150° C. and $10^{-4}$ Torr for 5 hours.

This negative electrode was evaluated in the same manner as in Example 1, except that an electrolytic solution that had been prepared by dissolving an electrolyte salt of lithium perchlorate in a mixed solvent (1/1, by volume) of ethylene carbonate and dimethyl carbonate at a concentration of 1 mol/liter, was used.

As a result, the negative electrode was found to have an initial charging-discharging Coulomb efficiency of 84% and a discharging capacity of 361 mAh/g-carbon.

EXAMPLE 3

A sheet negative electrode was formed in the same manner as in Example 1, except that the vacuum heat treatment of the carbon material was conducted at 800° C. and $10^{-6}$ Torr for 5 hours.

This negative electrode was evaluated in the same manner as in Example 1, except that an electrolytic solution that had been prepared by dissolving an electrolyte salt of lithium perchlorate in a mixed solvent (1/1, by volume) of ethylene carbonate and ethylmethyl carbonate at a concentration of 1 mol/liter, was used.

As a result, the negative electrode was found to have an initial charging-discharging Coulomb efficiency of 84% and a discharging capacity of 361 mAh/g-carbon.

EXAMPLE 4

A sheet negative electrode was formed in the same manner as in Example 1, except that the vacuum heat treatment of the carbon material was conducted at 500° C. and $10^{-6}$ Torr for 5 hours.

This negative electrode was evaluated in the same manner as in Example 1.

As a result, the negative electrode was found to have an initial charging-discharging Coulomb efficiency of 83% and a discharging capacity of 360 mAh/g-carbon.

COMPARATIVE EXAMPLE 1

A sheet negative electrode was formed in the same manner as in Example 1, except that a non-treated artificial graphite powder (KS-25; produced by Lonza Co.) was used as the active material.

This negative electrode was evaluated in the same manner as in Example 1.

As a result, the negative electrode was found to have an initial charging-discharging Coulomb efficiency of 80% and aedischarging capacity of 359 mAh/g-carbon.

COMPARATIVE EXAMPLE 2

A sheet negative electrode was formed in the same manner as in Example 1, except that the vacuum heat treatment of the carbon material was conducted at 400° C. and $10^{-6}$ Torr for 5 hours.

This negative electrode was evaluated in the same manner as in Example 1.

As a result, the negative electrode was found to have an initial charging-discharging Coulomb efficiency of 80% and a discharging capacity of 360 mAh/g-carbon.

COMPARATIVE EXAMPLE 3

A sheet negative electrode was formed in the same manner as in Example 1, except that the vacuum heat treatment of the carbon material was conducted at 1000° C. and $10^{-3}$ Torr for 5 hours.

This negative electrode was evaluated in the same manner as in Example 1.

As a result, the negative electrode was found to have an initial charging-discharging Coulomb efficiency of 80% and a discharging capacity of 354 mAh/g-carbon.

COMPARATIVE EXAMPLE 4

A sheet negative electrode was formed in the same manner as in Example 1, except that the active material was prepared by heat-treating an artificial graphite powder (KS-25; produced by Lonza Co.) at 1000° C. in a nitrogen atmosphere for 5 hours.

This negative electrode was evaluated in the same manner as in Example 1.

As a result, the negative electrode was found to have an initial charging-discharging Coulomb efficiency of 77% and a discharging capacity of 356 mAh/g-carbon.

COMPARATIVE EXAMPLE 5

A sheet negative electrode was formed in the same manner as in Example 1, except that the active material was prepared by stirring an artificial graphite powder (KS-25; produced by Lonza Co.) in 70% nitric acid for 4 hours at room temperature followed by drying it at 70° C. at normal pressure.

This negative electrode was evaluated in the same manner as in Example 1.

As a result, the negative electrode was found to have an initial charging-discharging Coulomb efficiency of 79% and a discharging capacity of 358 mAh/g-carbon.

COMPARATIVE EXAMPLE 6

A sheet negative electrode was formed in the same manner as in Example 1, except that the active material was prepared by stirring an artificial graphite powder (KS-25; produced by Lonza Co.) in an ethanol solution of 1 mol/liter of lithium ethoxide for 24 hours at room temperature, then drying it at 70° C. at normal pressure and thereafter heat-treating it in an argon gas atmosphere at 750° C. for 2 hours.

This negative electrode was evaluated in the same manner as in Example 1.

As a result, the negative electrode was found to have an initial charging-discharging Coulomb efficiency of 75% and a discharging capacity of 335 mAh/g-carbon.

The results of Examples 1 to 4 and Comparative Examples 1 to 6 are shown in Table 1 below.

TABLE 1

|  | Efficiency (%) | Discharging Capacity (mAh/g) |
| --- | --- | --- |
| Example 1 | 85 | 360 |
| Example 2 | 84 | 361 |
| Example 3 | 84 | 361 |
| Example 4 | 83 | 360 |
| Comparative Example 1 | 80 | 359 |
| Comparative Example 2 | 80 | 360 |
| Comparative Example 3 | 80 | 354 |
| Comparative Example 4 | 77 | 356 |
| Comparative Example 5 | 79 | 358 |
| Comparative Example 6 | 75 | 335 |

From Examples 1 to 4 and Comparative Examples 1 to 3, it is understood that the vacuum heat treatment of the carbon material is effective when it is conducted at a pressure not higher than $10^{-4}$ Torr and at a temperature not lower than 500° C. It is also understood therefrom that the negative electrode comprising a graphite material that had been subjected to the effective vacuum heat treatment under the above-mentioned conditions had a reduced irreversible capacity at the initial charging step and had an increased charging-discharging Coulomb efficiency.

From Comparative Example 4, it is seen that the heat treatment of the graphite-type carbon material in an inert atmosphere and the chemical treatment of the material with an acid are insufficient. In addition, from Comparative Examples 5 and 6, it is known that the effect of the wet heat treatment of the graphite-type carbon material is also insufficient.

EXAMPLE 5

A sheet negative electrode was formed in the same manner as in Example 1, except that an artificial graphite powder (HAG-150; produced by Nippon Kokuen Ltd.) comprising flaky particles having a particle size of 0.7 μm, $d_{002}$ of 0.338 nm, Lc of 14 nm, La of 25 nm and a specific surface area of 150 m²/g was subjected to the same vacuum heat treatment as in Example 1 and used as the active material.

This negative electrode was evaluated in the same manner as in Example 1.

As a result, the negative electrode was found to have an initial charging-discharging Coulomb efficiency of 55% and a discharging capacity of 355 mAh/g-carbon.

COMPARATIVE EXAMPLE 7

A sheet negative electrode was formed in the same manner as in Example 1, except that a non-treated artificial graphite powder (HAG-150; produced by Nippon Kokuen Ltd.) was used as the active material.

This negative electrode was evaluated in the same manner as in Example 1.

As a result, the negative electrode was found to have an initial charging-discharging Coulomb efficiency of 36% and a discharging capacity of 355 mAh/g-carbon.

The results of Example 5 and Comparative Example 7 are shown in Table 2 below.

From Table 2, it is seen that the vacuum heat treatment is effective also for the graphite material having a large specific surface area. The negative electrode of Example 5 was found to have a reduced irreversible capacity at the initial charging step and therefore have an increased charging-discharging Coulomb efficiency. An negative electrode material having such a large specific surface area has excellent current characteristics. Using the negative electrode of this type, therefore, it is possible to plan non-aqueous secondary batteries having excellent rapid charging-discharging characteristics.

EXAMPLE 6

A sheet negative electrode was formed in the same manner as in Example 1, except that carbon black (HS-500; produced by Asahi Carbon Co.) comprising spherical particles having a particle size of 0.8 μm, $d_{002}$ of 0.358 nm, Lc of 2.0 nm and La of 10 nm was subjected to the same vacuum heat treatment as in Example 1 and used as the active material.

This negative electrode was evaluated in the same manner as in Example 1, except that an electrolytic solution that had been prepared by dissolving an electrolyte salt of lithium perchlorate in a mixed solvent (1/1, by volume) of propylene carbonate and 1,2-dimethoxyethane at a concentration of 1 mol/liter, was used.

As a result, the negative electrode was found to have an initial charging-discharging Coulomb efficiency of 73% and a discharging capacity of 324 mAh/g-carbon.

COMPARATIVE EXAMPLE 8

A sheet negative electrode was formed in the same manner as in Example 1, except that a non-treated carbon black (HS-500; produced by Asahi Carbon Co.) was used as the active material.

This negative electrode was evaluated in the same manner as in Example 1.

As a result, the negative electrode was found to have an initial charging-discharging Coulomb efficiency of 64% and a discharging capacity of 322 mAh/g-carbon.

The results of Example 6 and Comparative Example 8 are shown in Table 2 below.

TABLE 2

|  | Efficiency (%) | Discharging Capacity (mAh/g) |
|---|---|---|
| Example 5 | 55 | 355 |
| Example 6 | 73 | 324 |
| Comparative Example 7 | 36 | 355 |
| Comparative Example 8 | 64 | 322 |

From Table 2 above, it is seen that the vacuum heat treatment is effective also for carbon material other than graphite. The negative electrode of Example 6 was found to have a reduced irreversible capacity at the initial charging step and therefore have an increased charging-discharging Coulomb efficiency. Such a carbon material other than graphite is not so strictly limited as graphite, with respect to its compatibility with electrolytic solutions, etc. Therefore, using a carbon material other than graphite as the negative electrode, it is easy to plan various batteries.

Comparing the results of the above-mentioned Example 1 and those of Example 6, it is seen that the negative electrode comprising a high-crystalline carbon material such as artificial graphite has a discharging capacity nearer to its theoretical capacity (372 mAh/g-carbon) than that comprising a low-crystalline carbon material such as carbon black. Therefore, the former is more suitable for the planning of high-capacity secondary batteries.

EXAMPLE 7

Formation of Carbon Material by Heat Treatment in Vacuum Followed by Treatment with Oxygen-free Hydrocarbon Gas:

As the raw carbon materals sample, used was the same artificial graphite powder (KS-25; produced by Lonza Co.) as that used in Example 1.

First, 5 g of the graphite powder was shaped into a tablet, using a tablet-shaping machine, and then treated in a high-temperature vacuum furnace at 1000° C. for 5 hours at $10^{-6}$ Torr. After the treatment, this was cooled to room temperature still in the vacuum, and a mixed gas of ethylene/argon (2/8, by volume) was introduced into the chamber until the internal pressure became $10^{-3}$ Torr. The graphite tablet was treated in this chamber. After this, the tablet was ground in an agate mortar. In this way, a graphite powder that had been heat-treated in a vacuum was obtained.

Formation and Evaluation of Negative Electrode:

The graphite powder that had been prepared according to the process mentioned above was formed into a sheet negative electrode in the same manner as in Example 1. The negative electrode was then evaluated in the same manner as in Example 1.

As a result, the negative electrode was found to have an initial charging-discharging Coulomb efficiency of 87% and a discharging capacity of 360 mAh/g-carbon.

EXAMPLE 8

A sheet negative electrode was formed in the same manner as in Example 7, except that the vacuum heat treatment of the carbon material was conducted at 1150° C. for 5 hours and that the heat-treated carbon material was then treated in a mixed gas of propylene/argon (1/9, by volume) at $10^{-4}$ Torr and thereafter cooled to room temperature.

This negative electrode was evaluated in the same manner as in Example 1, except that an electrolytic solution that had been prepared by dissolving an electrolyte salt of lithium perchlorate in a mixed solvent (1/1, by volume) of ethylene carbonate and dimethyl carbonate at a concentration of 1 mol/liter, was used.

As a result, the negative electrode was found to have an initial charging-discharging Coulomb efficiency of 85% and a discharging capacity of 360 mAh/g-carbon.

EXAMPLE 9

A sheet negative electrode was formed in the same manner as in Example 7, except that the vacuum heat treatment of the carbon material was conducted at 800° C. and $10^{-6}$ Torr for 5 hours and that the heat-treated carbon material was then cooled to room temperature and a reducing gas of butylene only was introduced into the chamber up to the atmospheric pressure.

This negative electrode was evaluated in the same manner as in Example 1, except that an electrolytic solution that had been prepared by dissolving an electrolyte salt of lithium perchlorate in a mixed solvent (1/1, by volume) of ethylene carbonate and dimethyl carbonate at a concentration of 1 mol/liter, was used.

As a result, the negative electrode was found to have an initial charging-discharging Coulomb efficiency of 85% and a discharging capacity of 361 mAh/g-carbon.

EXAMPLE 10

A sheet negative electrode was formed in the same manner as in Example 7, except that the vacuum heat treatment of the carbon material was conducted at 500° C. and $10^{-6}$ Torr for 5 hours and that the heat-treated carbon material was then treated with a reducing gas of a mixed gas of acetylene/argon (1/1, by volume).

This negative electrode was evaluated in the same manner as in Example 1.

As a result, the negative electrode was found to have an initial charging-discharging Coulomb efficiency of 83% and a discharging capacity of 360 mAh/g-carbon.

COMPARATIVE EXAMPLE 9

A sheet negative electrode was formed in the same manner as in Example 7, except that a non-treated artificial graphite powder (KS-25; produced by Lonza Co.) was used as the active material.

This negative electrode was evaluated in the same manner as in Example 1.

As a result, the negative electrode was found to have an initial charging-discharging Coulomb efficiency of 80% and a discharging capacity of 359 mAh/g-carbon.

COMPARATIVE EXAMPLE 10

A sheet negative electrode was formed in the same manner as in Example 7, except that the vacuum heat treatment of the carbon material was conducted at 400° C. and $10^{-6}$ Torr for 5 hours.

This negative electrode was evaluated in the same manner as in Example 1.

As a result, the negative electrode was found to have an initial charging-discharging Coulomb efficiency of 80% and a discharging capacity of 360 mAh/g-carbon.

COMPARATIVE EXAMPLE 11

A sheet negative electrode was formed in the same manner as in Example 7, except that the vacuum heat treatment of the carbon material was conducted at 1000° C. and $10^{-3}$ Torr for 5 hours.

This negative electrode was evaluated in the same manner as in Example 1.

As a result, the negative electrode was found to have an initial charging-discharging Coulomb efficiency of 80% and a discharging capacity of 354 mAh/g-carbon.

The results of Examples 7 to 10 and Comparative Examples 9 to 11 are shown in Table 3 below.

TABLE 3

|  | Efficiency (%) | Discharging Capacity (mAh/g) |
| --- | --- | --- |
| Example 7 | 87 | 360 |
| Example 8 | 85 | 360 |
| Example 9 | 85 | 361 |
| Example 10 | 83 | 360 |
| Comparative Example 9 | 80 | 359 |
| Comparative Example 10 | 80 | 360 |
| Comparative Example 11 | 80 | 354 |

From Examples 7 to 10 and Comparative Examples 9 to 11, it is known that the negative electrodes each comprising a graphite that had been heat-treated in a vacuum and then treated with a single or mixed gas comprising a hydrocarbon gas or/and a hydrogen gas have a higher charging-discharging Coulomb efficiency than those comprising a graphite that had been subjected to only the vacuum treatment.

EXAMPLE 11

A sheet negative electrode was formed in the same manner as in Example 7, except that an artificial graphite powder (HAG-150; produced by Nippon Kokuen Ltd.) comprising flaky particles having a particle size of 0.7 µm, $d_{002}$ of 0.338 nm, Lc of 14 nm, La of 25 nm and a specific surface area of 150 m$^2$/g was treated in the same manner as in Example 7 and used as the active material.

This negative electrode was evaluated in the same manner as in Example 1.

As a result, the negative electrode was found to have an initial charging-discharging Coulomb efficiency of 55% and a discharging capacity of 355 mAh/g-carbon.

COMPARATIVE EXAMPLE 12

A sheet negative electrode was formed in the same manner as in Example 7, except that a non-treated artificial graphite powder (HAG-150; produced by Nippon Kokuen Ltd.) was used as the active material.

This negative electrode was evaluated in the same manner as in Example 1.

As a result, the negative electrode was found to have an initial charging-discharging Coulomb efficiency of 36% and a discharging capacity of 355 mAh/g-carbon.

The results of Example 11 and Comparative Example 12 are shown in Table 4 below.

From Table 4, it is understood that the vacuum heat treatment followed by the treatment with a single or mixed gas comprising a hydrocarbon gas or/and a hydrogen gas is effective also for the graphite material having a large specific surface area. The negative electrode of Example 11 was found to have a reduced irreversible capacity at the initial charging step and therefore have an increased charging-discharging Coulomb efficiency. An negative electrode material having such a large specific surface area has excellent current characteristics. Using the negative electrode of this type, therefore, it is possible to plan non-aqueous secondary batteries having excellent radid charging-discharging characteristics.

EXAMPLE 12

A sheet negative electrode was formed in the same manner as in Example 7, except that carbon black (HS-500; produced by Asahi Carbon Co.) comprising spherical particles having a particle size of 0.8 µm, $d_{,002}$ of 0.358 nm, Lc of 2.0 nm and La of 10 nm was treated in the same manner as in Example 7 and used as the active material.

This negative electrode was evaluated in the same manner as in Example 1, except that an electrolytic solution that had been prepared by dissolving an electrolyte salt of lithium perchlorate in a mixed solvent (1/1, by volume) of propylene carbonate and 1,2-dimethoxyethane at a concentration of 1 mol/liter, was used.

As a result, the negative electrode was found to have an initial charging-discharging Coulomb efficiency of 73% and a discharging capacity of 324 mAh/g-carbon.

COMPARATIVE EXAMPLE 13

A sheet negative electrode was formed in the same manner as in Example 7, except that a non-treated carbon black (HS-500; produced by Asahi Carbon Co.) was used as the active material.

This negative electrode was evaluated in the same manner as in Example 1.

As a result, the negative electrode was found to have an initial charging-discharging Coulomb efficiency of 64% and a discharging capacity of 322 mAh/g-carbon.

The results of Example 12 and Comparative Example 13 are shown in Table 4 below.

TABLE 4

|  | Efficiency (%) | Discharging Capacity (mAh/g) |
| --- | --- | --- |
| Example 11 | 55 | 355 |
| Example 12 | 73 | 324 |
| Comparative Example 12 | 36 | 355 |
| Comparative Example 13 | 64 | 322 |

From Table 4 above, it is understood that the vacuum heat treatment followed by the treatment with a single or mixed gas comprising a hydrocarbon gas or/and a hydrogen gas is effective also for the carbon material other than graphite. The negative electrode of Example 12 was found to have a reduced irreversible capacity at the initial charging step and therefore have an increased charging-discharging Coulomb efficiency. Such a carbon material other than graphite is not so strictly limited as graphite, with respect to its compatibility with electrolytic solutions, etc. Therefore, using a carbon material other than graphite as the negative electrode, it is easy to plan various batteries.

Comparing the results of the above-mentioned Example 7 and those of Example 12, it is understood that the negative electrode comprising a high-crystalline carbon material such as artificial graphite has a discharging capacity nearer to its theoretical capacity (372 mAh/g-carbon) than that comprising a low-crystalline carbon material such as carbon black. Therefore, the former is more suitable for the planning of high-capacity secondary batteries.

EXAMPLE 13

Formation of Carbon Material by Heat Treatment in Reducing Gas:

A carbon material was heat-treated in a reducing gas according to the process as mentioned below. As the raw material sample, used was an artificial graphite powder (KS-25; produced by Lonza Co.). First, 10 g of the graphite powder were put on a copper dish and heated up to 1000° C. in a nitrogen gas atmosphere in an electric furnace. Next, a mixed gas of propane/nitrogen (100/1900, by volume) was introduced into the reactor tube at a flow rate of 1.2 cm/min for 10 minutes. After this treatment, the thus-treated graphite powder was cooled to room temperature still in the nitrogen atmosphere and then taken out of the furnace. In this way, a graphite powder that had been heat-treated in a reducing gas was obtained.

Formation of Negative Electrode:

A negative electrode was formed in the same manner as in Example 1, except that the graphite powder prepared in the previous step was used and that the drying was conducted at 150° C. in a vacuum (at $10^{-3}$ Torr). The thus-formed negative electrode had an apparent surface area of 8 cm$^2$ and a thickness of 150 μm (including the thickness of the collector of 50 μm).

Evaluation of Negative Electrode:

The negative electrode thus formed was evaluated in the same manner as in Example 1.

As a result, the negative electrode was found to have a ratio of the quantity of the initial discharging electricity to the quantity of the initial charging electricity (initial charging-discharging Coulomb efficiency) of 89% and a discharging capacity of 360 mAh/g-carbon.

EXAMPLE 14

A sheet negative electrode was formed using a graphite powder that had been treated in the same manner as in Example 13, except that the heat treatment in the reducing gas was conducted at 1600° C. and that ethane was used as the reducing gas and argon as the carrier gas.

This negative electrode was evaluated in the same manner as in Example 1, except that an electrolytic solution that had been prepared by dissolving an electrolyte salt of lithium perchlorate in a mixed solvent (1/1, by volume) of ethylene carbonate and dimethvl carbonate at a concentration of 1 mol/liter, was used.

As a result, the negative electrode was found to have an initial charging-discharging Coulomb efficiency of 88% and a discharging capacity of 359 mAh/g-carbon.

EXAMPLE 15

A sheet negative electrode was formed using a graphite powder that had been treated in the same manner as in Example 13, except that the heat treatment in the reducing gas was conducted at 800° C. and that acetylene was used as the reducing gas.

This negative electrode was evaluated in the same manner as in Example 1, except that an electrolytic solution that had been prepared by dissolving an electrolyte salt of lithium perchlorate in a mixed solvent (1/1, by volume) of ethylene carbonate and ethylmethyl carbonate at a concentration of 1 mol/liter, was used.

As a result, the negative electrode was found to have an initial charging-discharging Coulomb efficiency of 88% and a discharging capacity of 360 mAh/g-carbon.

EXAMPLE 16

A sheet negative electrode was formed using a graphite powder that had been treated in the same manner as in Example 13, except that the heat treatment in the reducing gas was conducted at 600° C.

This negative electrode was evaluated in the same manner as in Example 1.

As a result, the negative electrode was found to have an initial charging-discharging Coulomb efficiency of 87% and a discharging capacity of 360 mAh/g-carbon.

EXAMPLE 17

A sheet negative electrode was formed using a graphite powder that had been treated in the same manner as in Example 13, except that the heat treatment in the reducing gas was conducted at 400° C.

This negative electrode was evaluated in the same manner as in Example 1.

As a result, the negative electrode was found to have an initial charging-discharging Coulomb efficiency of 84% and a discharging capacity of 359 mAh/g-carbon.

EXAMPLE 18

A sheet negative electrode was formed using a graphite powder that had been treated in the same manner as in Example 13, except that the heat treatment was conducted in a reducing gas of a mixture of propane/nitrogen (100/3900, by volume) for 60 minutes at a flow rate of the mixed gas of 2.4 cm/min.

This negative electrode was evaluated in the same manner as in Example 1.

As a result, thne negative electrode was found to have an initial charging-discharging Coulomb efficiency of 87% and a discharging capacity of 358 mAh/g-carbon.

EXAMPLE 19

A sheet negative electrode was formed using a graphite powder that had been treated in the same manner as in Example 13, except that the heat treatment was conducted in a reducing gas of a mixture of propane/nitrogen (400/1600, by volume) at a flow rate of the mixed gas of 0.6 cm/min.

This negative electrode was evaluated in the same manner as in Example 1.

As a result, the negative electrode was found to have an initial charging-discharging Coulomb efficiency of 88% and a discharging capacity of 357 mAh/g-carbon.

EXAMPLE 20

A sheet negative electrode was formed using a graphite powder that had been treated in the same manner as in Example 19, except that the heat treatment was conducted in the reducing gas for 5 minutes.

This negative electrode was evaluated in the same manner as in Example 1.

As a result, the negative electrode was found to have an initial charging-discharging Coulomb efficiency of 88% and a discharging capacity of 359 mAh/g-carbon.

EXAMPLE 21

A sheet negative electrode was formed using a graphite powder that had been treated in the same manner as in Example 13, except that the heat treatment was conducted in a reducing gas of a mixture of hydrogen/argon (10/1990, by volume) for 30 minutes.

This negative electrode was evaluated in the same manner as in Example 1.

As a result, the negative electrode was found to have an initial charging-discharging Coulomb efficiency of 85% and a discharging capacity of 358 mAh/g-carbon.

COMPARATIVE EXAMPLE 14

A sheet negative electrode was formed in the same manner as in Example 13, except that a non-treated artificial graphite powder (KS-25; produced by Lonza Co.) was used as the active material.

This negative electrode was evaluated in the same manner as in Example 1.

As a result, the negative electrode was found to have an initial charging-discharging Coulomb efficiency of 80% and a discharging capacity of 359 mAh/g-carbon.

COMPARATIVE EXAMPLE 15

A sheet negative electrode was formed using a graphite powder that had been treated in the same manner as in Example 13, except that the heat treatment was conducted in the reducing gas at 300° C.

This negative electrode was evaluated in the same manner as in Example 1.

As a result, the negative electrode was found to have an initial charging-discharging Coulomb efficiency of 80% and a discharging capacity of 360 mAh/g-carbon.

COMPARATIVE EXAMPLE 16

A sheet negative electrode was formed in the same manner as in Example 13, except that an artificial graphite powder (KS-25; produced by Lonza Co.) that had been heat-treated in nitrogen at 1000° C. for 5 hours was used as the active material.

This negative electrode was evaluated in the same manner as in Example 13.

As a result, the negative electrode was found to have an initial charging-discharging Coulomb efficiency of 77% and a discharging capacity of 356 mAh/g-carbon.

COMPARATIVE EXAMPLE 17

A sheet negative electrode was formed in the same manner as in Example 13, except that the active material was prepared by stirring an artificial graphite powder (KS-25; produced by Lonza Co.) in 70% nitric acid for 4 hours at room temperature followed by drying it at 70° C. at normal pressure.

This negative electrode was evaluated in the same manner as in Example 13.

As a result, the negative electrode was found to have an initial charging-discharging Coulomb efficiency of 79% and a discharging capacity of 358 mAh/g-carbon.

COMPARATIVE EXAMPLE 18

A sheet negative electrode was formed in the same manner as in Example 13, except that the active material was prepared by stirring an artificial graphite powder (KS-25; produced by Lonza Co.) in an ethanol solution of 1 mol/liter of lithium ethoxide for 24 hours at room temperature, then drying it at 70° C. at normal pressure and thereafter heat-treating it in an argon gas atmosphere at 750° C. for 2 hours.

This negative electrode was evaluated in the same manner as in Example 13.

As a result, the negative electrode was found to have an initial charging-discharging Coulomb efficiency of 75% and a discharging capacity of 335 mAh/g-carbon.

The results of Examples 13 to 21 and Comparative Examples 14 to 18 are shown in Table 5 below.

TABLE 5

|  | Efficiency (%) | Discharging Capacity (mAh/g) |
| --- | --- | --- |
| Example 13 | 89 | 360 |
| Example 14 | 88 | 359 |
| Example 15 | 88 | 360 |
| Example 16 | 87 | 360 |
| Example 17 | 84 | 359 |
| Example 18 | 87 | 358 |
| Example 19 | 88 | 357 |
| Example 20 | 88 | 359 |
| Example 21 | 85 | 358 |
| Comparative Example 14 | 80 | 359 |
| Comparative Example 15 | 80 | 360 |
| Comparative Example 16 | 77 | 356 |
| Comparative Example 17 | 79 | 358 |
| Comparative Example 18 | 75 | 335 |

From Table 5 above, it is understood that the heat treatment of the carbon material in a reducing gas is effective when it was conducted at a temperature not lower than 400° C. It is also known therefrom that the negative electrode comprising a graphite material that had been subjected to the effective heat treatment in a reducing gas had a reduced irreversible capacity at the initial charging step and had an increased charging-discharging Coulomb efficiency.

EXAMPLE 22

A sheet negative electrode was formed in the same manner as in Example 13, except that an artificial graphite powder (HAG-150; produced by Nippon Kokuen Ltd.) was subjected to the same heat treatment in the reducing gas as in Example 13 and used as the active material.

This negative electrode was evaluated in the same manner as in Example 1.

As a result, the negative electrode was found to have an initial charging-discharging Coulomb efficiency of 60% and a discharging capacity of 355 mAh/g-carbon.

COMPARATIVE EXAMPLE 19

A sheet negative electrode was formed in the same manner as in Example 13, except that a non-treated artificial graphite powder (HAG-150; produced by Nippon Kokuen Ltd.) was used as the active material.

This negative electrode was evaluated in the same manner as in Example 1.

As a result, the negative electrode was found to have an initial charging-discharging Coulomb efficiency of 36% and a discharging capacity of 355 mAh/g-carbon.

EXAMPLE 23

A sheet negative electrode was formed in the same manner as in Example 13, except that carbon black (HS-500; produced by Asahi Carbon Co.) was subjected to the same heat treatment in the reducing gas as in Example 13 and used as the active material.

This negative electrode was evaluated in the same manner as in Example 1, except that an electrolytic solution that had been prepared by dissolving an electrolyte salt of lithium perchlorate in a mixed solvent (1/1, by volume) of propylene carbonate and 1,2-dimethoxyethane at a concentration of 1 mol/liter, was used.

As a result, the negative electrode was found to have an initial charging-discharging Coulomb efficiency of 75% and a discharging capacity of 324 mAh/g-carbon.

COMPARATIVE EXAMPLE 20

A sheet negative electrode was formed in the same manner as in Example 13, except that a non-treated carbon black (HS-500; produced by Asahi Carbon Co.) was used as the active material.

This negative electrode was evaluated in the same manner as in Example 1.

As a result, the negative electrode was found to have an initial charging-discharging Coulomb efficiency of 64% and a discharging capacity of 322 mAh/g-carbon.

The results of Examples 22 and 23 and Comparative Examples 19 and 20 are shown in Table 6 below.

TABLE 6

|  | Efficiency (%) | Discharging Capacity (mAh/g) |
|---|---|---|
| Example 22 | 60 | 355 |
| Example 23 | 75 | 324 |
| Comparative Example 19 | 36 | 355 |
| Comparative Example 20 | 64 | 322 |

From Table 6 above, it is understood that the heat treatment in a reducing gas is effective also for the graphite material having a large specific surface area. The negative electrode of Example 22 was found to have a reduced irreversible capacity at the initial charging step and therefore have an increased charging-discharging Coulomb efficiency. An negative electrode material having such a large specific surface area has excellent current characteristics. using the negative electrode of this type, therefore, it is possible to plan non-aqueous secondary batteries having excellent rapid charging-discharging characteristics.

From Table 6 above, it is also understood that the heat treatment in a reducing gas is effective also for the carbon material other than graphite. The negative electrode of Example 23 was found to have a reduced irreversible capacity at the initial charging step and therefore have an increased charging-discharging Coulomb efficiency.

Comparing the results of the above-mentioned Example 13 and those of Example 23, it is seen that the negative electrode comprising a high-crystalline carbon material such as artificial graphite has a discharging capacity nearer to its theoretical capacity (372 mAh/g-carbon) than that comprising a low-crvstalline carbon material such as carbon black. Therefore, the former is more suitable for the planning of high-capacity secondary batteries.

The carbon materials that had been treated by any one of the above-mentioned treatments were analyzed to obtain the ratio of oxygen atom/carbon atom on their surfaces. The results obtained are shown in Table 7 below. From these results, it is seen that the amount of the oxygen atoms existing on the surface of the treated carbon material was reduced relatively as compared with that on the surface of the non-treated carbon material.

TABLE 7

|  | Treating Method | Oxygen/Carbon |
|---|---|---|
| Carbon Material of Example 1 | Vacuum Heat Treatment | 0.01215 |
| Carbon Material of Example 7 | Treatment with Hydrocarbon Gas | 0.01135 |
| Carbon Material of Example 13 | Reducing Heat Treatment | 0.00835 |
| Carbon Material of Comparative Example 1 | Non-treated | 0.01435 |

EXAMPLE 24

Formation of Negative Electrode:

Graphite material that had been heat-treated in a vacuum in the same manner as in Example 1 was used as the active material for the negative electrode to be formed herein. A nonionic dispersing agent was added to the graphite material, and a dispersion of polytetrafluoroethylene was added thereto, in such an amount that the ratio by weight of the active material to polytetrafluoroethylene might be 91/9 after dried, to prepare a paste. This paste was coated into the pores of a three-dimensional porous nickel collector. This was dried at 60° C., heat-treated at 240° C., then shaped by pressing it and thereafter dried under reduced pressure at 200° C. to remove water. Thus, a tablet negative electrode having a diameter of 14.5 mm and a thickness of 0.41 mm was formed.

Formation of Positive Electrode:

A positive electrode is formed as follows: A powder of an active material and an electroconductive material are dispersed in a solution or dispersion of a binder and kneaded to prepare a paste. This is coated on a collector foil or into the pores of a three-dimensional porous metal collector. Next, this is heat-treated at a temperature not lower than the boiling point of the solvent used and near to the melting point or softening point of the binder used, in an inert atmosphere at an atmospheric Dressure or a reduced pressure, to form a positive electrode.

In this example, lithium carbonate, cobalt carbonate and antimony trioxide were weiahed at an atomic ratio of lithium/cobalt/antimony of 1/0.95/0.05. These were mixed in a mortar, calcined in air at 900° C. for 20 hours and then ground in a mortar to obtain a powder of an active material. This active material had a composition of $Li_{0.98}Co_{0.95}Sb_{0.05}O_2$. The thus-obtained active material for a positive electrode was mixed with acetylene black, a nonionic dispersing agent was added thereto, and a dispersion of polytetrafluoroethylene was added thereto in such an amount that the ratio by weight of (active material)/(acetylene black)/(polytetraf luoroethvlene) might be 100/10/5 after dried, to prepare a paste. This paste was coated on a titanium mesh collector. This was pre-dried at 60° C., heat-treated at 240° C., then shaped by pressing it and thereafter dried under reduced pressure at 200° C. to remove water. Thus, a tablet positive electrode having a diameter of 15 mm and a thickness of 0.93 mm was Formed.

Construction of Batteries:

As shown in FIG. 1, the positive electrode 3 was stuck under pressure onto the positive electrode cell 1 composed of a positive electrode collector 2 welded on the inner surface of its bottom and an insulating packing 8 mounted thereon. Next, a separator 7 made of non-woven polypropylene fabric was mounted on the cell 1. An electrolytic solution that had been prepared by dissolving an electrolyte salt of $LiPF_6$ in a mixed solvent of ethylene carbonate/propylene carbonate/diethyl carbonate (2/1/3, by volume) at a concentration of 1 mol/liter was infiltrated into the separator 7. On the other hand, an negative electrode collector 5 was welded on the inner surface of an negative electrode cell 4, and the negative electrode 6 was stuck under pressure onto the negative electrode collector 5. Next, the negative electrode 6 was attached to the separator 7, and the negative electrode cell 1 and the positive electrode cell 4 were coupled and sealed via the insulating packing 8 to form a coin battery. Ten coin batteries were formed all under the same conditions. The capacity of every battery was defined on the basis of its negative electrode.

Evaluation of Batteries:

Each of these coin batteries thus formed was charged to have a charging-discharging current of 1 mA and a highest charging voltage of 4.2 V, and then further charged at a constant charging voltage of 4.2 V for 12 hours. Next, these were subjected to a charging-discharging cycle test where the lowest discharging voltage of each battery being tested was 2.5 V. The charging-discharging capacity and the self-discharging percentage of each battery were measured, and the shape of each battery after the test was evaluated.

As a result, the mean voltage of the batteries during discharging was 3.7 V, the initial discharging capacity thereof was 17 mAh, and the discharging capacity thereof at the 200th cycle was 16 mAh. The mean self-discharging percentage of the batteries was 4.8%/month. All these ten batteries tested were good, without being blistered or deformed, after 200 cycles of the test.

EXAMPLE 25

An negative electrode was formed in the same manner as in Example 24, except that the graphite material that had been heat-treated in a vacuum and then treated in a hydrocarbon gas according to the process of Example 7 was used as the active material. The size and the thickness of the negative electrode formed herein were the same as those of the negative electrode formed in Example 24. Using the negative electrode thus formed and the positive electrode formed in Example 24, a battery was constructed in the same manner as in Example 24. Ten coin batteries were formed all under the same conditions.

These batteries were evaluated in the same manner as in Example 24.

As a result, the mean voltage of the batteries during discharging was 3.7 V, the initial discharging capacity thereof was 18 mAh, and the discharging capacity thereof at the 200th cycle was 17 mAh. The mean self-discharging percentage of the batteries was 4.8%/month.

All these coin batteries tested were good, without being blistered or deformed, after 200 cycles of the test.

EXAMPLE 26

An negative electrode was formed in the same manner as in Example 24, except that the graphite material that had been heat-treated in a reducing gas according to the process of Example 13 was used as the active material. The size and the thickness of the negative electrode formed herein were the same as those of the negative electrode formed in Example 24. Using the negative electrode thus formed and the positive electrode formed in Example 24, a battery was constructed in the same manner as in Example 24. Ten coin batteries were formed all under the same conditions.

These batteries were evaluated in the same manner as in Example 24.

As a result, the mean voltage of the batteries during discharging was 3.7 V, the initial discharging capacity thereof was 18 mAh, and the discharging capacity thereof at the 200th cycle was 17 mAh. The mean self-discharging percentage of the batteries was 4.8%/month. All these ten batteries tested were good, without being blistered or deformed, after 200 cycles of the test.

EXAMPLE 27

Formation of Negative Electrode:

The carbon material of Example 26 that had been heat-treated in a reducing gas was used as the active material.

A nonionic dispersing agent was added to the carbon material, and a dispersion of polytetrafluoroethylene was added thereto, in such an amount that the ratio by weight of the carbon material to polytetrafluoroethylene might be 91/9 after dried, to prepare a paste. This paste was coated into the pores of a three-dimensional porous nickel collector. This was dried at 60° C., heat-treated at 240° C., then shaped by pressing it and thereafter dried under reduced pressure at 200° C. to remove water. Thus, a tablet negative electrode having a diameter of 14.5 mm and a thickness of 0.37 mm was formed.

Formation of Positive Electrode:

Lithium carbonate and manganese dioxide were weighed at an atomic ratio of lithium/manganese of 1.1/2. These were mixed in a mortar, calcined in air at 900° C. for 3 days and then ground in a mortar to obtain a powder of an active material of $LiMn_2O_4$. The thus-obtained active material for a positive electrode was mixed with an electroconductive material of a mixture comprised of acetylene black and expansive graphite at a ratio by weight of 2/1, a nonionic dispersing agent was added thereto, and a dispersion of polytetrafluoroethylene was added thereto in such an amount that the ratio by weight of (active material)/(electroconductive material)/(polytetrafluoroethylene) might be 100/10/5 after dried, to prepare a paste. This paste was coated on a titanium mesh collector. This was dried at 60° C., heat-treated at 240° C., then shaped by pressing it and thereafter dried under reduced pressure at 200° C. to remove water. Thus, a tablet positive electrode having a diameter of 14.5 mm and a thickness of 1.00 mm was formed.

Construction of Batteries:

A coin battery was constructed in the same manner as in Example 24, except that an electrolytic solution that had been prepared by dissolving $LiPF_6$ in a mixed solvent of ethylene carbonate/γ-butyrolactone/diethyl carbonate (3/1/3) at a concentration of 1 mol/liter, was used. Ten coin batteries were formed all under the same conditions. The capacity of every battery was defined on the basis of its negative electrode.

Evaluation of Batteries:

These batteries were evaluated in the same manner as in Example 24.

As a result, the mean voltage of the batteries during discharging was 3.7 V, the initial discharging capacity thereof was 17 mAh, and the discharging capacity thereof at the 200th cycle was 15 mAh. The self-discharging percentage of the batteries was 4.9%/month. All these ten batteries tested were good, without being blistered or deformed, after 200 cycles of the test.

COMPARATIVE EXAMPLE 21

An negative electrode was formed in the same manner as in Example 24, except that a non-treated artificial graphite (KS-25, produced by Lonza Co.) was used as the active material. The size and the thickness of the negative electrode formed herein were the same as those of the negative electrode formed in Example 24. Using the negative electrode thus formed and the positive electrode formed in Example 24, a battery was constructed in the same manner as in Example 24. Ten coin batteries were formed all under the same conditions.

These batteries were evaluated in the same manner as in Example 24.

As a result, the mean voltage of the batteries during discharging was 3.7 V, the initial discharging capacity thereof was 13 mAh, and the discharging capacity thereof at the 200th cycle was 9 mAh. The self-discharging percentage of the batteries was 5.0%/month. One of these ten batteries tested was blistered after 200 cycles of the test.

COMPARATIVE EXAMPLE 22

A tablet negative electrode was formed in the same manner as in Example 27, except that a non-treated artificial graphite (KS-25, produced by Lonza Co.) was used as the active material and that the thickness of the tablet negative electrode was 0.35 mm. A tablet positive electrode was formed in the same manner as in Example 22, except that its thickness was 1.02 mm. Using these, a battery was constructed in the same manner as in Example 22. Ten coin batteries were formed all under the same conditions.

These batteries were evaluated in the same manner as in Example 24.

As a result, the mean voltage of the batteries during discharging was 3.7 V, the initial discharging capacity thereof was 11 mAh, and the discharging capacity thereof at the 200th cycle was 7 mAh. The self-discharging percentage of the batteries was 5.0%/month. Two of these ten batteries tested were blistered after 200 cycles of the test. The results of Examples 24 to 27 and Comparative Examples 21 and 22 are shown in Table 8 below.

as the active material, a carbon material that had been subjected to vacuum heat treatment, to vacuum heat treatment followed by treatment with a hydrocarbon gas or to heat treatment in a reducing gas, was used. This is because a large amount of the active material of the negative electrode was filled in the batteries since the negative electrode had an improved initial charging-discharging Coulomb efficiency. After the charging-discharging cycle test, these batteries were all good without being blistered because of the absence of the decomposition of the electrolytic solution therein to give gas or the absence of the peeling of the electrodes. Thus, these batteries of the present invention are excellent non-aqueous secondary batteries having good cycle characteristics. In addition, the self-discharging of these batteries was small.

In the non-aaueous secondary battery of the present invention, the reactions between the oxygen-containing functional groups existing on the surface of the carbon material of the negative electrode and lithium are retarded with the result that the initial charging-discharging efficiency of the battery is improved. Therefore, since the amount of lithium that is necessary for the side reactions at the first charging step is decreased, it is possible to decrease the excess amount of the active material for the positive electrode to be in the secondary battery in planning the battery.

In addition, in the non-aqueous secondary battery of the present invention, since the side reactions between the oxygen-containing functional groups existing on the surface of the carbon material of the negative electrode and lithium that has been stored in the carbon material while the battery has been charged are retarded, the self-discharging of the battery is reduced. Moreover, since the side reactions between the oxygen-containing functional groups existing on the surface of the carbon material of the negative electrode and the electrolytic solution in the battery of the present invention are retarded, the decomposition of the electrolytic solution is also retarded and therefore the electrolytic solution is prevented from being depleted or from generating gas. For these reasons, there is provided according to the present invention a non-aqueous secondary battery having a much higher capacity and a much higher energy density, which additionally has excellent charging-discharging cycle characteristics with retarded self-dischargeability and is safe.

According to the present invention, a carbon material that has previously been heat-treated in a reducing gas can be

TABLE 8

| | Discharging Capacity (mAh) | | | | | |
|---|---|---|---|---|---|---|
| Number of Cycles | Example 24 | Example 25 | Example 26 | Example 27 | Comparative Example 21 | Comparative Example 22 |
| 1 | 17 | 18 | 18 | 17 | 13 | 11 |
| 50 | 16 | 17 | 17 | 16 | 11 | 9 |
| 100 | 16 | 17 | 17 | 16 | 11 | 9 |
| 150 | 16 | 17 | 17 | 15 | 9 | 8 |
| 200 | 16 | 17 | 17 | 15 | 9 | 7 |
| Self-discharging Percentage (%/month) | 4.8 | 4.8 | 4.8 | 4.9 | 5.0 | 5.0 |
| Shape of Batteries after 200 Cycles | Good | Good | Good | Good | One of ten was blistered | Two of ten were blistered |

From Table 8 above, it is understood that high-capacity secondary batteries were obtained in the examples of the present invention where an negative electrode comprising, used as the active material for the negative electrode. Using such a carbon material, therefore, it is possible to provide the non-aqueous secondary battery of the present invention having the constitution mentioned hereinabove by a simple process.

What is claimed is:

1. A process of improving an initial charging-discharging efficiency of a non-aqueous secondary battery, the process comprising:

(1) cutting chemical bonds between carbon atoms and oxygen atoms on a surface of a graphite material and substantially removing the oxygen atoms from the surface of the graphite material, the graphite material having layers between which lithium ions can be intercalated/deintercalated;

(2) providing a positive electrode containing a lithium-containing chalcogenide compound;

(3) providing a negative electrode comprising the graphite material of step (1);

(4) providing a non-aqueous ion conductor between the positive electrode and the negative electrode.

2. The method of claim 1, wherein step (1) includes using a graphite material having a mean spacing between the (002) planes ($d_{002}$) of from 0.335 to 0.340 nm, a lattice thickness in the direction of the (002) plane (Lc) of 10 nm or more and a lattice thickness in the direction of the (110) plane (La) of 10 nm or more, when measured by X-ray wide-angle diffractometry.

3. The method of claim 1, wherein step (1) includes using a graphite material having a mean particle size of 0.7 to 25 μm, and a specific surface area of 12 to 150 m²/g.

4. The method of claim 1, wherein step (1) includes using a graphite material having the atomic ratio O/C of 0.01215 or below.

5. The method of claim 1, wherein step (2) includes using a lithium-containing chalcogenide compound which includes one of $LiCoO_2$, $LiNiO_2$, $LiFeO_2$, and $LiMn_2O_4$.

6. The method of claim 1, wherein step (2) includes using a lithium-containing chalcogenide compound which is a lithium-containing oxide of $Li_xM_{1-y}N_yO_2$ (where M is any one of Fe, Co and Ni, N is a transition metal, $0 \leq x \leq 1$, and $0 \leq y \leq 1$) or $LiM_{2-z}N_zO_4$ (where N is a transition metal, and $0 \leq z \leq 2$).

7. The method of claim 1, wherein step (1) comprises preparing the graphite material by vacuum heat-treating the graphite material at a temperature of from 500 degrees C to 1150 degrees C and at a pressure of from $10^{-7}$ Torr to $10^{-4}$ Torr.

8. The method of claim 1, wherein step (1) comprises preparing the graphite material by vacuum heat-treating the graphite material at a temperature of from 500 degrees C. to 1150 degrees C. and at a pressure of from $10^{-7}$ Torr to $10^{-4}$ Torr followed by treating it in an oxygen-free hydrocarbon gas and/or hydrogen gas.

9. The method of claim 1, wherein the removal of the oxygen atoms renders the initial charging-discharging efficiency of the battery greater than 80%.

10. The method of claim 1, wherein an oxygen/carbon atomic ratio (O/C) of the surface of the graphite material is reduced by 15% or more after completion of step (1) than had step (1) not been performed.

* * * * *